| United States Patent [19] | [11] | 4,280,947 |
|---|---|---|
| Mori | [45] | Jul. 28, 1981 |

[54] PAINT CONTAINING SILICONE ELASTOMER

[76] Inventor: Tokishige Mori, 4-10, Suwa-cho 3-chome, Nakamura-ku, Nagoya-shi, Aichi-ken, Japan

[21] Appl. No.: 59,154

[22] Filed: Jul. 20, 1979

[30] Foreign Application Priority Data

Aug. 8, 1978 [JP] Japan .................................. 53-97031

[51] Int. Cl.³ ............................................... C08K 5/01
[52] U.S. Cl. ........................... 260/33.6 SB; 260/18 S; 260/33.8 SB
[58] Field of Search ........ 260/18 S, 33.6 SB, 33.8 SB

[56] References Cited

U.S. PATENT DOCUMENTS

| 2,757,152 | 7/1956 | Solomon ...................... 260/33.8 SB |
| 3,705,823 | 12/1972 | Hosokawa et al. ........... 260/33.8 SB |

*Primary Examiner*—Edward J. Smith
*Attorney, Agent, or Firm*—David M. Ostfeld

[57] ABSTRACT

Disclosed herein is a paint containing silicone elastomer which is curable under room temperature. The paint is obtained by mixing liquid or paste silicone curable to elastomeric, an organic solvent, a paint film stabilizer, an oil paint and a curing agent for curing the silicone. The paint can easily be coated on substrates by a conventional means such as a brush, a roller and a spray gun.

3 Claims, No Drawings

PAINT CONTAINING SILICONE ELASTOMER

BACKGROUND OF THE INVENTION

The present invention relates to improvements in an oil paint, and more particularly, to a paint containing silicone composition curable to an elastomer.

In general, paint films formed on substrates such as buildings and building construction materials are required not to be affected by sunbeams, ultraviolet rays or water and not to be cracked or exfoliated in consequence of expansion and contraction of the substrates. Conventional paints such as acrylic paints, polyester paints, melamine paints, urethane paints, vinyl paints and oil paints are not able to satisfy these requirements, and the substrates coated by these paints tend to be exposed and corroded by cracking of the paint films. Therefore, in harsh environment such as industrial and coastal areas, the substrates must be repainted every two or three years at the longest. The present invention contemplates overcoming the aforementioned disadvantages of the conventional paints by providing a reliable new paint.

SUMMARY OF THE INVENTION

It is an object of the present invention to provide a paint containing silicone composition curable to an elastomer in which paint films formed thereby will not be cracked or exfoliated in consequence of contraction and expansion of substrates.

It is another object of the present invention to provide a paint containing silicone composition curable to an elastomer, the film of which will not be affected by sunbeams, ultraviolet rays, ozone or water.

It is still another object of the present invention to provide a paint containing silicone composition curable to an elastomer by which the substrate is efficiently and effectively coated.

The film formed by the paint according to the present invention has high water resisting property, ozone resistance, cold resistance and chemical resistance, and further, since the film has elasticity, it can effectively follow expansion and contraction of the substrate and will not be cracked or exfoliated. Therefore, the paint according to the present invention is particularly suitable for use in industrial areas with much air pollution and coastal areas with stiff sea breezes.

DESCRIPTION OF PREFERRED EMBODIMENTS

The paint according to the present invention comprises liquid or paste silicone composition curable to an elastomer, an organic solvent, especially a nonpolar solvent suitable for diluting a paint, a paint film stabilizer, an oil paint and a curing agent for the silicone composition, and will not be cracked or exfoliated after forming a film. The paint of the present invention is produced by mixing 10 parts by volume (parts hereinafter referred to are all by volume) of the liquid or paste silicone composition, 10 to 30 parts of the organic solvent, 3 to 6 parts of the paint film stabilizer, 1 to 10 parts of the oil paint and the curing agent having necessary volume for curing the silicone composition. Although the order of mixing of the components is optional, the curing agent should be the last to be added. The curing agent is preferably added to the mixture of the other components just before use, and therefore it is convenient to make the paint as a two-package type in which the curing agent and the mixture of the other components are separately prepared and mixed with each other just before coating. If the mixture ratios of the components are in excess or below the aforementioned ratios, it will lead to lowering in strength of the paint film and in effectiveness of coating, and further, cracking and exfoliation of the film.

The liquid or paste silicone composition comprises as a base reactive polyorganosiloxane having at the end of its molecule a reactive radical such as a hydroxyl radical bonded with a silicon atom in the silicone molecule, followed by addition of an inorganic filler such as fine silica, diatomaceous earth and calcium carbonate with addition of a pigment at need, and is two-package type which is made curable by addition of a curing agent. The silicone composition curable to an elastomer may be selected from conventional silicone sealants vulcanizable under room temperature, such as Tosseal 361 of Toshiba Silicone Kabushiki Kaisha, of which properties are as follows:

characteristic: aminoxy type main component: d,w-dihydroxypoly(diorganosiloxane)

apparent viscosity under a temperature of 25° C.: about 80,000 centipoises as a mixture of a base polymer and an inorganic filler general purpose: construction sealant The organic solvent is selected from conventional solvents such as kerosene, gasoline and trichloroethylene utilized for paints in general. The paint film stabilizer functions to maintain the film at a certain thickness, protect the film from dust and improve the wear strength thereof, and is selected from fine glass beads, glass fiber and asbestos. The paint film stabilizer may also be prepared from fine powder of silicone elastomer which had been cured and wasted. The oil paint is selected at desire from boiled oil, a mixed paint and enamel.

The curing agent for silicone composition is generally selected from one or more kinds of silanes or low molecular weight polysiloxanes having in the molecules thereof averagely two or more radicals which react with the reactable radical of the reactable polyorganosiloxane respectively. In particular, it is preferable to prepare the curing agent from low molecular weight polysiloxane having in its molecule averagely two or more diorganoaminoxy radicals which react with a hydroxyl radical bonded with a silicon atom to emit hydroxylamine compound as is well known in the art. For example, "Toseal 361 CAT" of Toshiba Silicone Kabushiki Kaisha, of which the main component is low molecular weight polysiloxane may be used as the curing agent, which, in turn, may be prepared from a combination of two aminoxy radical containing polysiloxane such as

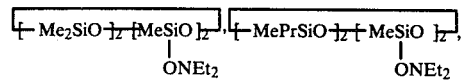

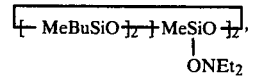

and Et$_2$NOMe$_2$SiOPh$_2$SiOMe$_2$SiONEt$_2$, and three aminoxy radical containing polysiloxane such as -continued

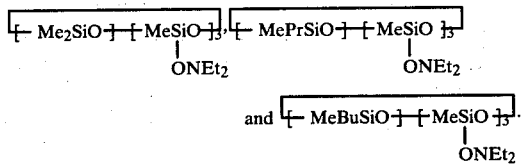

In the above chemical formulas, Me indicates the methyl group, Et indicates the ethyl group, Bu indicates the butyl group, Pr indicates the propyl group and Ph indicates the phenyl group respectively.

The paint according to the present invention can easily be coated on a substrate utilizing a conventional means such as a brush, a roller and a spray gun to form a film having a certain thickness. The thickness of the paint film should be at least 0.4 mm to take effect of the silicone composition curable to an elastomer contained in the paint. Since the paint according to the present invention has elasticity by virtue of silicone composition curable to an elastomer contained therein, the paint film after drying can follow contraction and expansion of the substrate caused by temperature change, and will not be cracked or exfoliated as the films formed by the conventional paints. The paint according to the present invention can be coated on substrates by spraying since it has low viscosity by virtue of the organic solvent. Further, since the paint according to the present invention contains silicone composition curable to an elastomer, the film has high and improved water resisting property, ozone resistance, cold resistance and chemical resistance.

The invention will now be described in further detail by way of examples. In description of these examples, parts referred to are all by volume.

EXAMPLE 1

A paint of one liter having the following composition was prepared:
uncured silicone composition curable to an elastomer (Tosseal 361): 10 parts
kerosene: 25 parts
fine powder of waste silicone elastomer which had been cured and wasted 5 parts (with diameter of 0.1 mm to 0.5 mm):
mixed white paint: 8 parts
curing agent (Toseal 361 CAT): 0.3 parts The mixed white paint utilized in this Example was composed of 12% of zinc white, 3% of titanium white, 45% of extender pigment, 37% of boiled oil and 3% of volatile oil (benzine).

The paint thus prepared containing a silicone composition curable to an elastomer was coated by a spray gun on one side each of a pair of slates of 30 cm×30 cm×0.5 cm to obtain test slates. The paint had low viscosity, and was easily sprayed by the spray gun. Coating on each test slate was effected twice to obtain a paint film having a thickness of about 0.6 mm in average. Simultaneously, the mixed white paint of the aforementioned composition was coated on another slate to obtain a contrast slate coated with a paint film having a thickness of about 0.6 mm. Then the test slates and the comparative slate were put in a chamber under a temperature of 100° C. for 6 hours, and thereafter submitted to visual inspection. The films formed on the test slates remained smooth with no cracking or exfoliation while the film formed on the comparative slate was cracked.

Then the test slates and a new comparative slate prepared in the aforementioned manner were put in a freezer under a temperature of −30° C. for 6 hours, and thereafter submitted to visual inspection. The films formed on the test slates remained smooth while a part of the film formed on the comparative slate was cracked. There was no exfoliation on the films.

Although the slates showed a difference of about 3 mm in thickness by the temperature change between 100° C. and −30° C. in this Example, the films formed by the paint of the present invention could effectively follow expansion and contraction of the slates.

EXAMPLE 2

4 parts of calcium carbonate (1.4 microns), 1 part of alumina powder (80 millimicrons) and 1 part of fumed silica (15 millimicrons) were added to 10 parts of d,w-dihydroxypoly(dimethylsiloxane) having viscosity of 3,000 centipoises and mixed uniformly to obtain a base compound, followed by addition of kerosene three times the volume thereof. Then 200 parts of glass beads having an average particle diameter of 100 microns were mixed thereinto.

A curing agent was prepared by 6 parts of a polysiloxane mixture having aminoxy radical of the following composition:

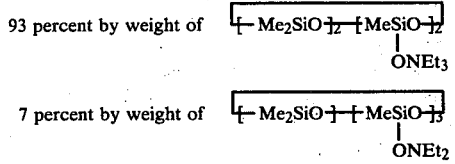

(Me indicates the methyl group and Et indicates the ethyl group respectively.)

The curing agent thus prepared was mixed into the aforementioned mixture to obtain a paint containing silicone composition curable to an elastomer. The paint was coated on one side of a slate by a spray gun and dried and cured under room temperature to form a film having an average thickness of 0.7 mm. The slate thus prepared was left in an atmosphere under a temperature of 100° C. for 12 hours. The slate was then left in an atmosphere under a temperature of 40° C. for 6 hours and in another atmosphere under a temperature of −30° C. for 6 hours alternately 12 times. The film formed by the aforementioned paint remained smooth.

EXAMPLE 3

A galvanized iron plate having a thickness of 0.4 mm was coated by the paint obtained in the Example 1 and the mixed white paint used in the Example 1 respectively, and left in an atmosphere under a temperature of 100° C. for 6 hours. Then the plate was bent along a mandrel having a diameter of 3 mm. The film formed by the paint according to the present invention remained smooth while the film formed by the mixed white paint showed cracking and exfoliation.

While the invention has been described with reference to a few preferred embodiments thereof, it is to be understood that modifications or variations may be easily made without departing from the scope of this invention which is defined by the appended claims.

What is claimed is:

1. A paint containing silicone composition curable to an elastomer comprising:
   about 10 parts by volume of liquid or paste silicone composition curable to an elastomer;
   about 10 to 30 parts by volume of an organic solvent;
   about 3 to 6 parts by volume of a paint film stabilizer;
   about 1–10 parts by volume of an oil paint; and a curing agent for said silicone composition;
   wherein said paint film stabilizer comprises glass beads.

2. A paint containing silicone composition curable to an elastomer comprising:
   about 10 parts by volume of liquid or paste silicone composition curable to an elastomer;
   about 10 to 30 parts by volume of an organic solvent;
   about 3 to 6 parts by volume of a paint film stabilizer;
   about 1–10 parts by volume of an oil paint; and a curing agent for said silicone composition;
   wherein said paint film stabilizer comprises fine powders of cured silicone elastomer.

3. A paint containing silicone composition curable to an elastomer comprising:
   about 10 parts by volume of liquid or paste silicone composition curable to an elastomer;
   about 10 to 30 parts by volume of an organic solvent;
   about 3 to 6 parts by volume of a paint film stabilizer;
   about 1–10 parts by volume of an oil paint; and a curing agent for said silicone composition;
   wherein said curing agent for said silicone is low molecular weight polysiloxane having in its molecule averagely two or more diorganoaminoxy radicals reacting with a hydroxyl radical or reactive polyorganosiloxane.

* * * * *